US007039699B1

(12) United States Patent
Narin et al.

(10) Patent No.: US 7,039,699 B1
(45) Date of Patent: May 2, 2006

(54) TRACKING USAGE BEHAVIOR IN COMPUTER SYSTEMS

(75) Inventors: Attila Narin, Bothell, WA (US); Keith A. Kegley, Seattle, WA (US); David A. Sobeski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/563,706

(22) Filed: May 2, 2000

(51) Int. Cl.
    G06F 15/16 (2006.01)
(52) U.S. Cl. .......................... 709/224; 709/207; 705/10
(58) Field of Classification Search ................ 709/201, 709/202, 203, 206, 207, 217, 219, 225, 226, 709/236, 246; 705/10, 26; 707/104.1; 725/34; 713/168; 711/164
    See application file for complete search history.

(56) References Cited

U.S. PATENT DOCUMENTS

| 5,774,670 | A * | 6/1998 | Montulli ...................... 709/227 |
| 5,991,735 | A * | 11/1999 | Gerace ......................... 705/10 |
| 6,339,423 | B1 * | 1/2002 | Sampson et al. ........... 709/219 |
| 6,405,214 | B1 * | 6/2002 | Meade, II ................ 707/104.1 |
| 6,421,768 | B1 * | 7/2002 | Purpura ...................... 711/164 |
| 6,601,170 | B1 * | 7/2003 | Wallace, Jr. ................ 713/168 |
| 2002/0007317 | A1 * | 1/2002 | Callaghan et al. ............ 705/26 |
| 2003/0135853 | A1 * | 7/2003 | Goldman et al. ............. 725/34 |

OTHER PUBLICATIONS

St. Laurent, Simon, Cookies, 1998, McGraw-Hill, pp. 17-22 and 308.*
"Web Cookies: Their Reason, Nature, and Security," Jun. 1997 BITS: *computing and communications news*, pp. 1-5, http://www.lanl.gov/projects/ia/library bits/bits0697.html, Jan. 31, 2000 4:51 PM.
"I-034: Internet Cookies," U.S. Department of Energy, Computer Incident Advisory Capability, Information Bulletin, Mar. 12, 1998 23:00 GMT, pp. 1-6, http://ciac.11nl.gov/ciac/bulletins/i-034,shtml, Jan. 19, 2000.
Eamonn Sullivan, "Are Web-based Cookies a treat or a recipe for trouble?", PC Week Labs, Jun. 26, 1996, pp. 1-2, http://www.zdnet.com/pcweek/reviews/0624/24cook2.html, Jan. 31, 2000 4:42 PM.

(Continued)

*Primary Examiner*—Paul H. Kang
(74) *Attorney, Agent, or Firm*—Woodcock Washburn LLP

(57) ABSTRACT

A system and process for tracking users' usage of content in computer systems. The tracking and accumulation of content usage information allows content providers to understand more about their user base. In a computer system having numerous users, it is advantageous to provide relevant customized content in addition to any specifically requested content. By storing and processing content usage information for users in a computer system, customized content may be provided to a user based on the user's previous usage of similar content. In operation, a computer system hosting various content creates a unique identifier, having data storage space, for a given user of the computer system. When a user sends a request for content to the computer system, a unique identifier is created and/or updated with information relevant to a user's content request. The identifier is passed back to the user with the specifically desired content. When processing subsequent requests for content, the computer system updates the unique identifier with most recent usage information. In addition, the computer system processes the unique identifier for previous usage information in an effort to provide customized relevant content, in addition to the specifically desired content.

27 Claims, 11 Drawing Sheets

OTHER PUBLICATIONS

"Persistent Client State HTTP Cookies, Preliminary Specification—Use with caution," Netscape, Support Documentation, Client Side State—HTTP Cookies, pp. 1-5, http://home.netscape.com/newsref/std/cookie_spec.html, Jan. 19, 2000.

David Whalen, "The Unofficial Cookie FAQ, Version 2.53", contributed to Cookie Central by David Whalen, pp. 1-18, http://www.cookiecentral.com/faq/, Jan. 19, 2000.

"Cookies", Index of Cookies, The Cookie Concept, Cookie Central, 1997-98, pp. 1-3, http://www.cookiecentral.com/cm/cm002.htm, Jan. 19, 2000.

"Maintaining State with Cookies," Maintaining State, Cookie Central, 1997-98, pp. 1-2, http://www.cookiecentral.com/usesm.htm, Jan. 19, 2000.

"Cookie Values," More Information on Cookies, Cookie Central, 1997-98, pp. 1-2, http://www.cookiecentral.com/mim03.htm, Jan. 19, 2000.

"Cookies: What they are and how they work," Netscape, Issue: 19970226-2, Created: Feb. 26, 1997, Last updated: Jan. 21, 1999, Product: Communicator, Navigator, pp. 1-2, http://help.netscape.com/kb/consumer/19970226-2/html, Jan. 19, 2000.

Matisse Enzer and Brian Wilson, "A step-by-step guide to using cookies to analyze user activity & create custom pages," Feb. 1997, pp. 1-7, http://www.netscapeworld.com/netscapeworld/nw-02-1997/nw-02-cookiehowto.html.

Lori Eichelberger, "Introduction: The Cookie Controversy," Cookie Central, 1997-98, http://www.cookiecentral.com/ccstory/index.html.

* cited by examiner

TRACKING USAGE BEHAVIOR IN COMPUTER SYSTEMS

BACKGROUND OF THE INVENTION

1. Field of the Invention

The present invention relates to the field of computer systems, and more particularly to a method and system for tracking customer usage of content found on computer systems.

2. Brief Description of Prior Developments

There has recently been a tremendous growth in the number of computers connected to the Internet. A client computer connected to the Internet can download digital information from server computers. Client application software typically accepts commands from a user and obtains data and services by sending requests to server applications running on the server computers. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the Gopher document protocol. The HTTP protocol is used to access data on the World Wide Web, often referred to as "the Web." The Web is an information service on the Internet providing documents and links between documents. It is made up of numerous Web sites located around the world that maintain and distribute electronic documents. A Web site may use one or more Web server computers that store and distribute documents in a number of formats, including the Hyper Text Markup Language (HTML). An HTML document includes text and metadata (commands providing formatting information), as well as embedded links that reference other data or documents. The referenced documents may represent text, graphics, or video. In addition, HTML documents may contain client scripts (e.g. Java Script or Visual Basic Script) that are executed on the browser. The browser executes these scripts in a scripting space. A script is a set of instructions that are executed at certain times, e.g. when a Web page is loading, when a Web page is done loading, when the user has clicked on a link, when an event has occurred, etc.

An intranet is a local area network containing Web servers and client computers operating in a manner similar to the World Wide Web described above. Typically, all of the computers on an intranet are contained within a company or organization.

A client computer connected to a network, such as a local area network, wide area network, an intranet, or the Internet, can download digital information from server computers. This digital information can be presented to a user with and executed by a Web browser.

Generally, the HTTP protocol is considered a "stateless" protocol, that is, the protocol is structured so that it does not require the cooperating web browser to maintain state information about the data that is communicated. Since HTTP is a "stateless" (non-persistent) protocol, it is impossible to differentiate between visits to a web site among a group of visitors, unless the server can somehow "mark" a visitor.

However, the HTTP "stateless" protocol shortcoming is overcome by today's Web browser applications through the use of "Cookies" technologies. In computer science terms, a cookie is an opaque piece of data held by an intermediary. In today's Web browser applications, Persistent Client State HTTP Cookies, more commonly known simply as Cookies, add persistence (i.e. state information) to Web networks by letting Web application developers store information on the client, such as, user names and preferences, so that this information is available from Web browsing session to Web browsing session. Cookies become a very useful tool in maintaining state variables on the Web. With cookies, Web developers (and operators) are afforded the ability to identify web users that navigate to and through Web sites during a Web browsing session.

In operation, cookies are a general mechanism that server side connections (such as CGI scripts) can use to both store and retrieve the information on the client side of the connection. The addition of a simple persistent, client-side state significantly extends the capabilities of Web-based client/server applications. A server, when returning an HTTP object to a client, may also send a piece of state information that the client will store. Included in that state object is a description of the range of URLs for which that state is valid. Any future HTTP requests made by the client which fall in that range will include a transmittal of the current value of the state object (i.e. "cookie") from the client back to the server.

As a source of state information, there are many reasons why a given Web site operator would wish to use cookies. These reasons range from the ability to allow Web site users to personalize information on visited Web sites, or to assist web-site operators in processing on-line sales/services, or simply for the purposes of tracking popular links or demographics associated with a Web user. Cookies also provide programmers with a quick and convenient means for keeping site content fresh and relevant to the user's interests. Additionally, a new application of cookie technology is to assist with back-end processing performed by Web sites. In this context, cookies may be used by Web sites to securely store data that a user may have shared with a visited Web site. Such information may be used to reduce the amount of processing performed by a Web site when a user subsequently visits the Web site.

Specifically, cookies generally consist of text-only strings that a web browser on a client computer can store until they expire. Cookies that have an expiration date are called persistent cookies, and survive browser sessions. Cookies without an expiration date are called session cookies, and they are only valid for the current browser session. A cookie is typically introduced to a client computer in the form of HTTP response header that is created and subsequently transferred by a server computer; it can also be introduced by client side script on the web browser. The header typically contains the domain name, path, lifetime (in form of expiration date/time), and additional space for operator defined variables that are set by the visited sites. If the lifetime variable of a given cookie is longer than the time the user spends at the site, then this string is saved to file for future reference.

For example, in a typical Web site navigation scenario, a user may request information from a particular Web site that maintains a unique URL address. If the user is visiting the Web site for the first time, the Web site may request of the user's browser to create a new cookie that is associated with the requested URL. In the alternative, if the user has already visited the targeted Web site, the Web site sends a request to process and update the already created cookie associated with the Web site URL. In this way, the server knows whether the user has visited the targeted Web site before and can coordinate the user's preferences for different Web pages on the targeted Web site. Armed with this information, Internet and Web site content providers can utilize cookies in a variety of ways including, to customize a Internet or Web user's surfing experience.

Given an increase in the number of Internet and Web site content providers, there is increasing competition among these providers to provide distinguishing features in their content to enhance a user's experience. It is hoped that the development of such features would translate into an increase in user traffic. In that light, Internet and Web site content providers are constantly looking for ways to track the behavior of computer users that visit their content. Having such information, a content provider could possibly customize information, product/service offerings based upon the computer user's surfing behavior. This information may serve as a basis to create distinguishing features that content providers seek in today's competitive marketplace. For example, some information sought to be tracked may include a computer user's point of entry to a given Internet site or, more importantly, the Internet page(s) and/or Internet sites that are visited by a computer user during an Internet surfing session.

On the Internet or in Web networks, a Web site is generally hosted on a domain. The domain provides a computer user with an address (e.g. a URL or portion thereof) by which he/she may gain access to a Web site or a group of Web sites. Accordingly, a domain may host a single Web site or provide the infrastructure to host multiple Web sites. In the latter case, a content provider supporting multiple Web sites on a singular domain may want to track the usage of hosted sites by a given client computer. Having such usage information, the content provider may generate specific affinities among the various sites visited by a client computer to customize content provided to a user during a domain Web surfing session.

However, content providers trying to track users through the use of traditional cookies are severely hampered. The use of traditional cookies is process intensive, placing a burden on the computer system hosting the content. In addition, conventional cookies technologies dictate that cookies created by a given domain are only sent back to the domain that originally sent them to the client computer, thereby making it difficult to track users who travel across several domains.

Stated differently, conventional methods to track computer users visiting Internet and Web sites have fallen short of content provider's needs, as they may require additional resources and burden processing. For example, certain content providers utilize and store computer user profiles created from computer user input that indicate preferences for a variety of information, products, and services. The use of user profiles, however, has several disadvantages including the need for abundant storage resources as large amounts of information are required to be stored for each user, and a lack of user privacy (i.e. the content provider maintains information that users may regard as confidential). Further, conventional methods for computer user tracking are domain specific. That is, the information gathered by existing tracking systems about a computer user's usage of Internet or Web site content is specifically limited to the navigation within one given domain during a computer user's Internet or Web site session.

It is thus desired to implement a tracking system for computer users that does not burden computing processing, guarantees anonymity, and is applicable to track computer users navigating to various content sites hosted on various domains. At the core of an infrastructure that could achieve these advantages is an apparatus and methods that would capitalize on existing Internet or Web browser application technologies.

SUMMARY OF THE INVENTION

In a computer system having at least one server computer, hosting varying content, and at least one client computer, usage information about the client computer's usage of the content in the computer system is processed and stored. This information is stored in a cookie having an encoded data format. The small sized cookie may be shared by all of the content hosted by the computer system.

In a typical scenario, a client computer requests specific content from the server computer. In response to the content request a cookie is created and/or updated to have information relevant to the request for content. The cookie is then transferred back to the client computer for future use. When additional content is requested by client computer from the server computers, the cookie is included in the subsequent request for content. Accordingly, the cookie is processed for and updated with content usage information. Further, employing the usage information, customized content may be created, in addition to the specifically requested content, and transferred to the requesting client computer. Other features of the present invention are described below.

DETAILED DESCRIPTION OF THE DRAWINGS

The technique for tracking a user's usage of content in computer systems is further described with reference to the accompanying drawings in which.

Figure 8:
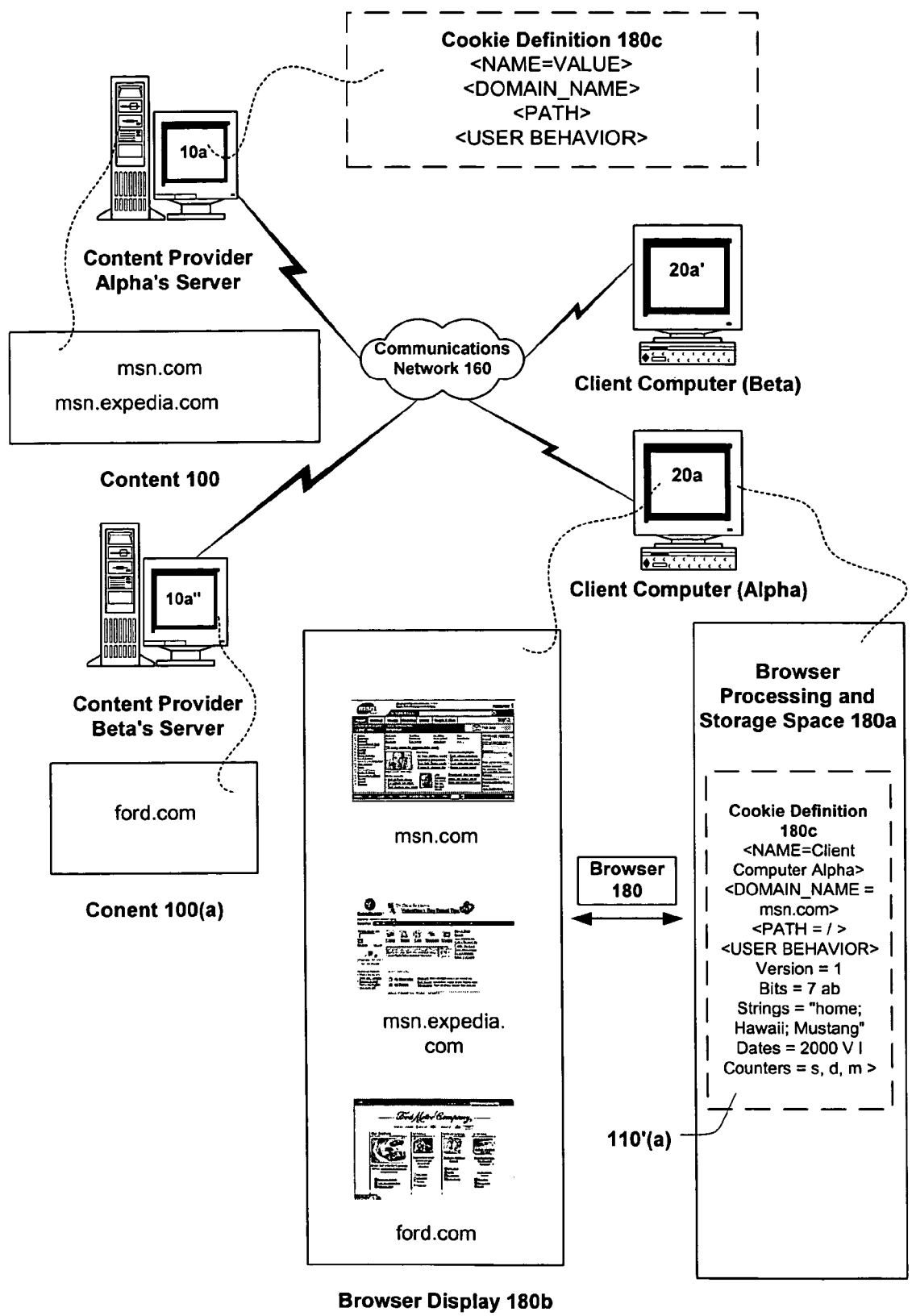
FIG. 8 is a block diagram illustrating the use of domain cookie in a computer network hosting a plurality of cooperating domains.
Figure 8A:
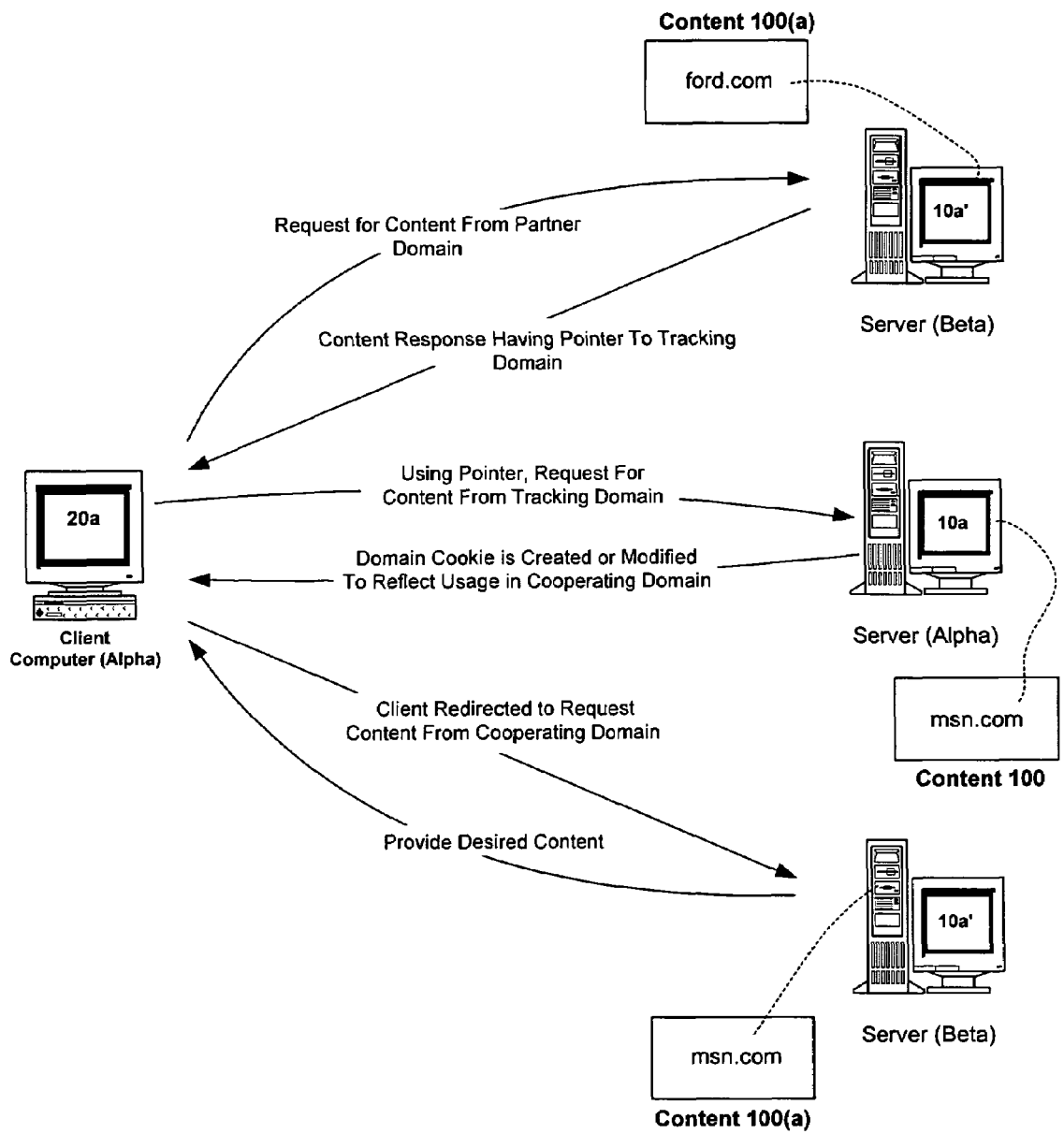
Figure 9:
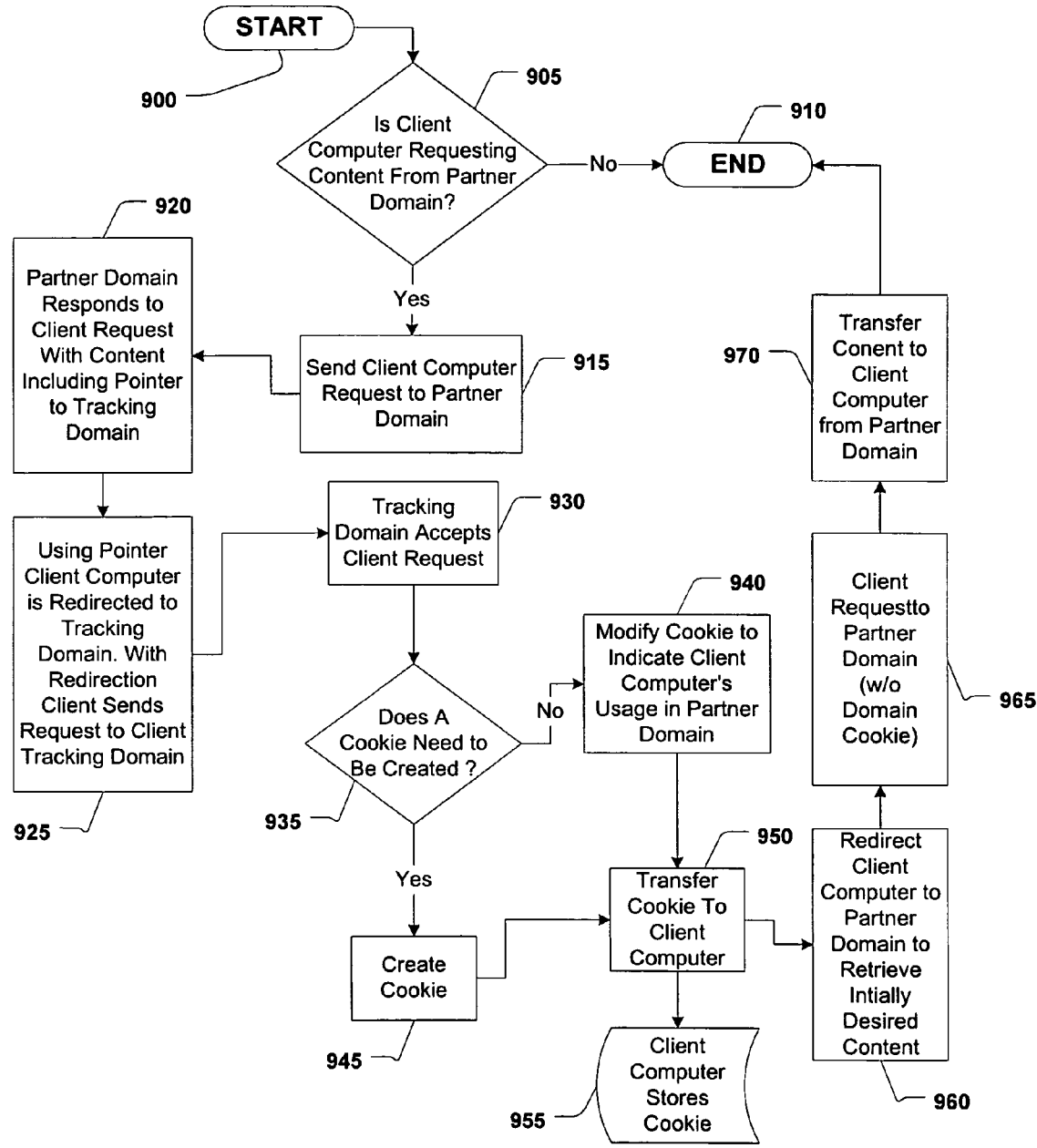

FIG. 8a is a block diagram illustrating the use of a domain cookie between a client computer and cooperating server computers outside of the tracking domain; and FIG. 9 is a flow diagram illustrating the processing undertaken by cooperating web servers outside the tracking domain to populate and process a newly created or updated tracking cookie, thereby tracking a client computer traveling across a computer system hosting a plurality of cooperating domains outside the tracking domain.

DETAILED DESCRIPTION OF ILLUSTRATIVE EMBODIMENTS

Overview

The present invention was developed to provide an improved, computer-based system for tracking users' usage behavior of content hosted on computer systems. In a computer network, a server computer hosting content typically knows very little about the user who requests such content, that is, all connected client computers are treated equally and anonymously. In the context of the Internet, little is known by Internet content providers about a user's (i.e. a client computer cooperating in a computer network) usage of the content provided. Some Internet content providers keep customer profiles in their own databases. However, only after a user registers with a Internet site and provides the information requested will the Internet content provider know something about the specific customer. Such information would also stay with the Internet content provider and would typically be specific to that Internet content. However, it would be desirable for an Internet content provider to know what its users are doing elsewhere on the Internet. The goal for an Internet content provider is to be as personally relevant and responsive to its most valued users. The value of a user could be determined by its behavior with other Internet content providers. This may be realized through a cooperation among Internet content providers to track and share user behaviors and properties. This would work especially well for Internet content providers that have existing collaborations, such as, MSN (Microsoft Network).

Currently Internet content providers, such as, MSN know very little about its users on-line behavior. While some MSN properties collect and maintain rich users profiles in their own databases, there is no shared profile store and no way to track user behavior across web sites. This makes it impossible to segment the MSN audience, identify and reward the best users, target ads and promotions effectively, and to deliver more relevant content for the individual user.

Theoretically, one solution to this problem would be to create a profile store that is shared between all MSN.COM properties in which all user data and behaviors are stored. Practically, this is not a feasible solution and would require significant changes to the web server architecture of all MSN.COM web sites in order to start using the shared profile store. Various technical challenges prevent this solution from being put into operation within reasonable time, and a simpler solution for the given problem would be desirable.

The present invention provides the desired solution by creating a domain level cookie for MSN.COM in which user behavior is recorded. This domain cookie would be used to share user information across MSN web sites. For each request a user makes to a MSN.COM property (e.g. EXPEDIA.MSN.COM, WWW.MSN.COM, INVESTOR.MSN.COM, etc.), this user will be transmitted to the Internet content server as part of the user's request. The server, hosting the desired Internet content, can then read the domain cookie or write something to the domain cookie. Reading from the domain cookie would be equivalent to checking what the user did elsewhere on MSN.COM. Writing to the domain cookie would be equivalent to recording something the user did during the current request so that other MSN web sites can take note of it when visited by the same user.

Using the information found in the domain cookie, Internet content sites will have the opportunity to determine those user behaviors observed in particular segments of the Internet content sites that may be helpful to differentiate the user when visiting each of those segments. Moreover, with the use of the domain cookie, Internet content providers are given an opportunity to determine those behaviors that are observed in a particular segment of the Internet content sites that may be helpful to differentiate the user when visiting other segments of the Internet content sites. For example, the following user behaviors on the MSN network may easily be recorded to assist Internet content providers to enhance a user's experience: Did the customer ever buy a plane ticket on EXPEDIA.MSN.COM (an Internet content site dedicated to selling airline products and services)? What was the destination of the journey? Does the customer have a Hotmail (Internet based centralized e-mail) account? How many times did the customer visit MSN.COM? Based on this information, MSN web sites will be able to render more relevant content for a given user and to provide customized content in accordance with behavioral data that has been collected about the user, and/or a user's preferences. Customized content may range from targeted advertising, to special limited services.

Once such a domain cookie is put in place, it will take some time before a sufficient amount of user behavior data is recorded. Events and/or behaviors can only be recorded into the cookie when the user exhibits a certain behavior. For example, in the context of the MSN example described above, whether the customer has a Hotmail account will only be known after the customer navigates to Hotmail and logs into his or her email account. Once a certain amount of user information is collected, it would be possible to analyze it to identify clustered behaviors of users. Such derived attributes could then be written to the user's domain cookie, e.g. a user type. For example, consider that user 1 exhibited behaviors A, B, and C, and user 2 exhibited behaviors A, B, and D. In this case, there might be an implied likelihood that user 1 is about to exhibit behavior D and user 2 is about to exhibit behavior C. Users 1 and 2 could thus be placed into the same user segment and could be of the same user type. Further, the user type could be used to target advertisements. For example, advertising behavior D to user 1 and behavior C to user 2 is likely to be more successful than presenting a random advertisement to these users.

Moreover, it would also be desirable for partner sites of MSN that are not part of the MSN.COM domain to contribute to the collection of user behaviors, e.g. writing information into the MSN.COM domain cookie. However, with the use of today's existing computing applications there lies a significant hurdle in implementing user tracking among collaborating Internet content providers. That is, inherently in cookie technologies is the limitation that cookies created by one given domain can not be transmitted to any other domain. In the context of MSN.COM, the problem becomes that the MSN.COM domain cookie can not be transmitted to a server that is outside the MSN.COM domain. The present invention provides a solution to this problem that would and enable partners of MSN who are not part of the MSN.COM domain to write to the MSN.COM domain cookie. In an illustrative implementation, the present invention provides an embedded image (which can be invisible) to be placed in a partner's web page where the source of the image points to an ASP (Active Server Page—a server-side execution environment in Microsoft Internet Information Server (IIS) 3.0 and higher that enables the execution of ActiveX™ scripts and ActiveX server components on the server) hosted on a server that is part of the MSN.COM domain. The client computer application will attempt to download the ASP page, and will generate a HTTP request to the server inside the MSN.COM domain. The MSN.COM domain cookie will travel with that request, and the ASP page has now the option of writing information to the cookie. As a last action, in addition to sending the possibly modified cookie back to the client, the ASP page redirects the client computer application to the actual image, which is then downloaded by the application and rendered as part of the page. The image can be hosted on any server, e.g. it doesn't have to be on a server that's part of the MSN.COM domain. Internet content segments that are within the MSN-.COM domain could also use this image approach if they only want to write to the cookie and not read from it. Appendix A provides examples with pseudo-code of illustrative implementations of the present invention performing the functions described above.

As will be described below with respect to FIGS. 1–9, the present invention is directed to a system and methods providing tracking of users navigating across computer networks. In accordance with an illustrative embodiment thereof, the present invention comprises a system and method to provide persistent information to computer network operators and content providers about a user's usage behavior in requesting and using the content hosted on a computer network.

In one embodiment, described more fully hereinafter, the methods and apparatus of the present invention may be implemented as part of a computer network such as the Internet having a plurality of server computers representing Internet content providers hosting content, such as Internet domains. Further, a plurality of users (i.e. client computers) are connected to the computer network through computer hardware and software (i.e. Web browsers) such that the user may request, transmit, and receive Internet content. Although the depicted embodiment provides tracking of users navigating across the Internet with Web browsers, those skilled in the art will appreciate that the inventive concepts described herein extend to the tracking of users of computer systems having various configurations.

Illustrative Computing Environment

Figure 1:
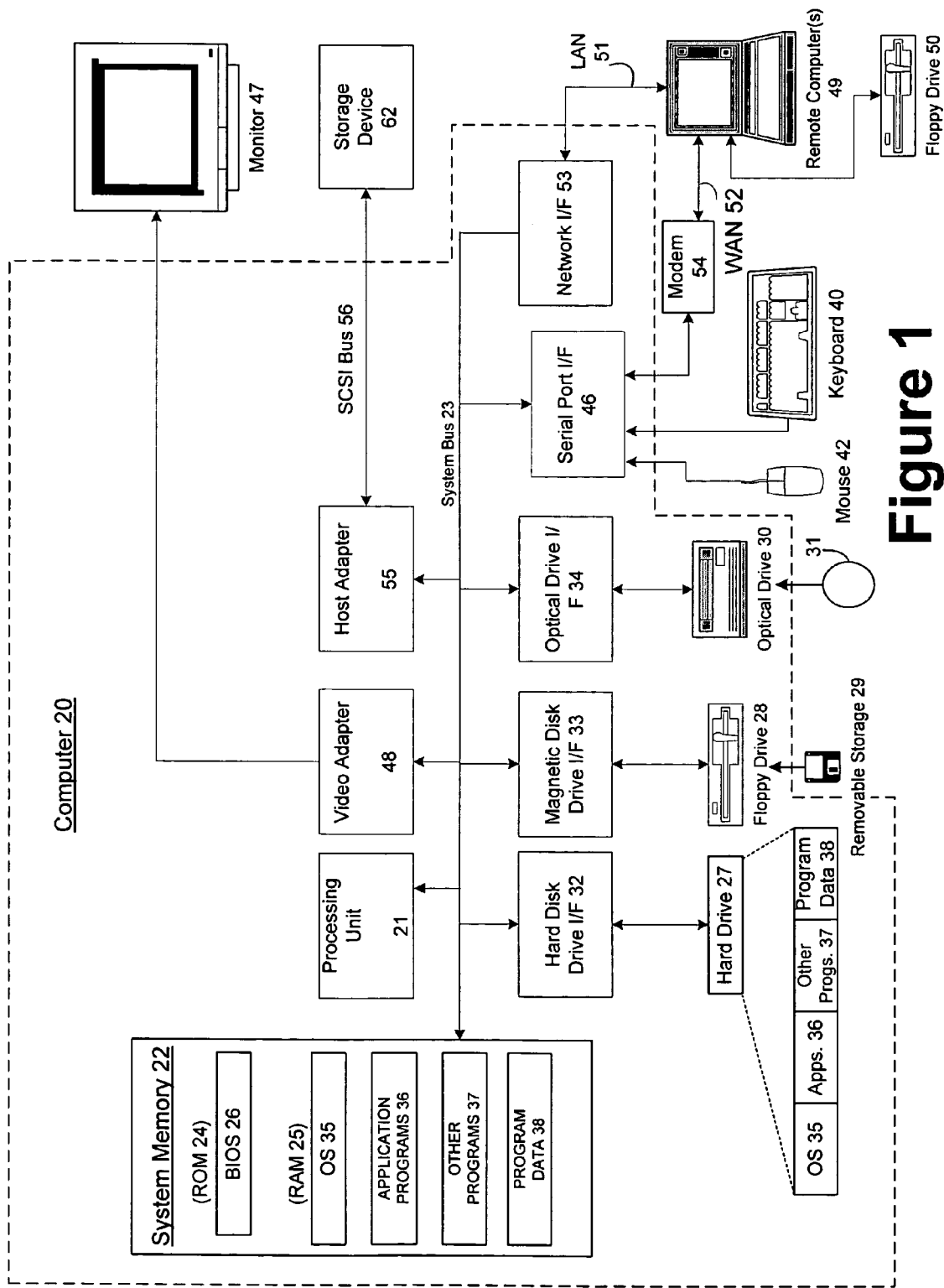
FIG. 1 is a block diagram representing a general purpose computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Illustrative Computer Network Environment

Figure 2:
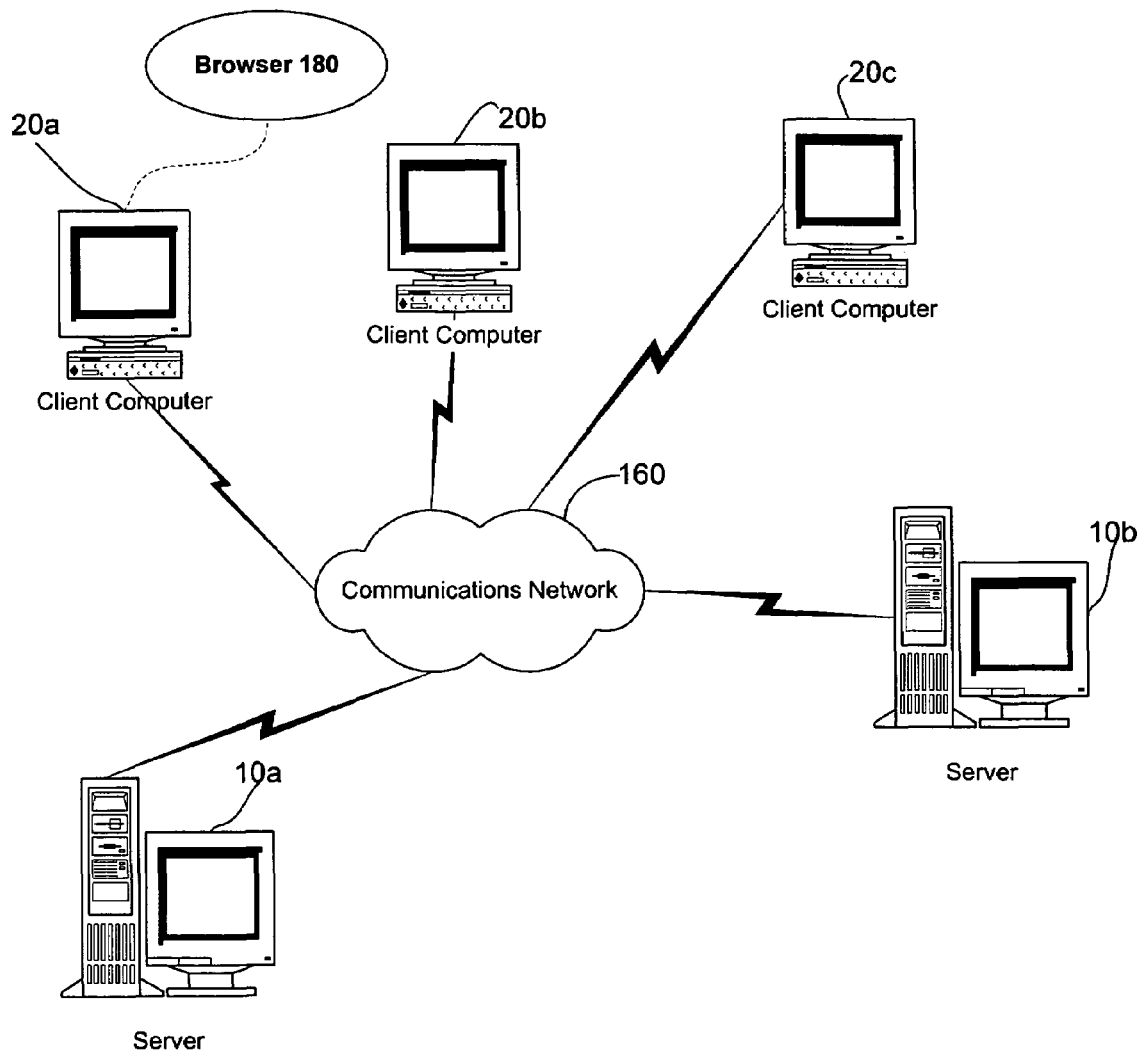
FIG. 2 is a block diagram representing an exemplary network environment with a server in accordance with the present invention.

As noted, the computer described above can be deployed as part of a computer network. In general, the above description applies to both server computers and client computers deployed in a network environment. FIG. 2 illustrates an exemplary network environment, with a server in communication with client computers via a network, in which the present invention may be employed. As shown in FIG. 2, a number of servers 10a, 10b, etc., are interconnected via a communications network 160 (which may be a LAN, WAN, intranet or the Internet) with a number of client computers 20a, 20b, 20c, etc. In a network environment in which the communications network 160 is the Internet, for example, the servers 10 can be Web servers with which the clients 20 communicate via any of a number of known protocols such as hypertext transfer protocol (HTTP). Each client computer 20 can be equipped with a browser 180 to gain access to the servers 10.

Thus, the present invention can be utilized in a computer network environment having client computers for accessing and interacting with the network and a server computer for interacting with client computers. However, the customer tracking across computer networks apparatus and method of the present invention can be implemented with a variety of network-based architectures, and thus should not be limited to the example shown. The present invention will now be described in more detail with reference to a presently illustrative implementation.

Customer Tracking Across Computer Networks

Figure 3:
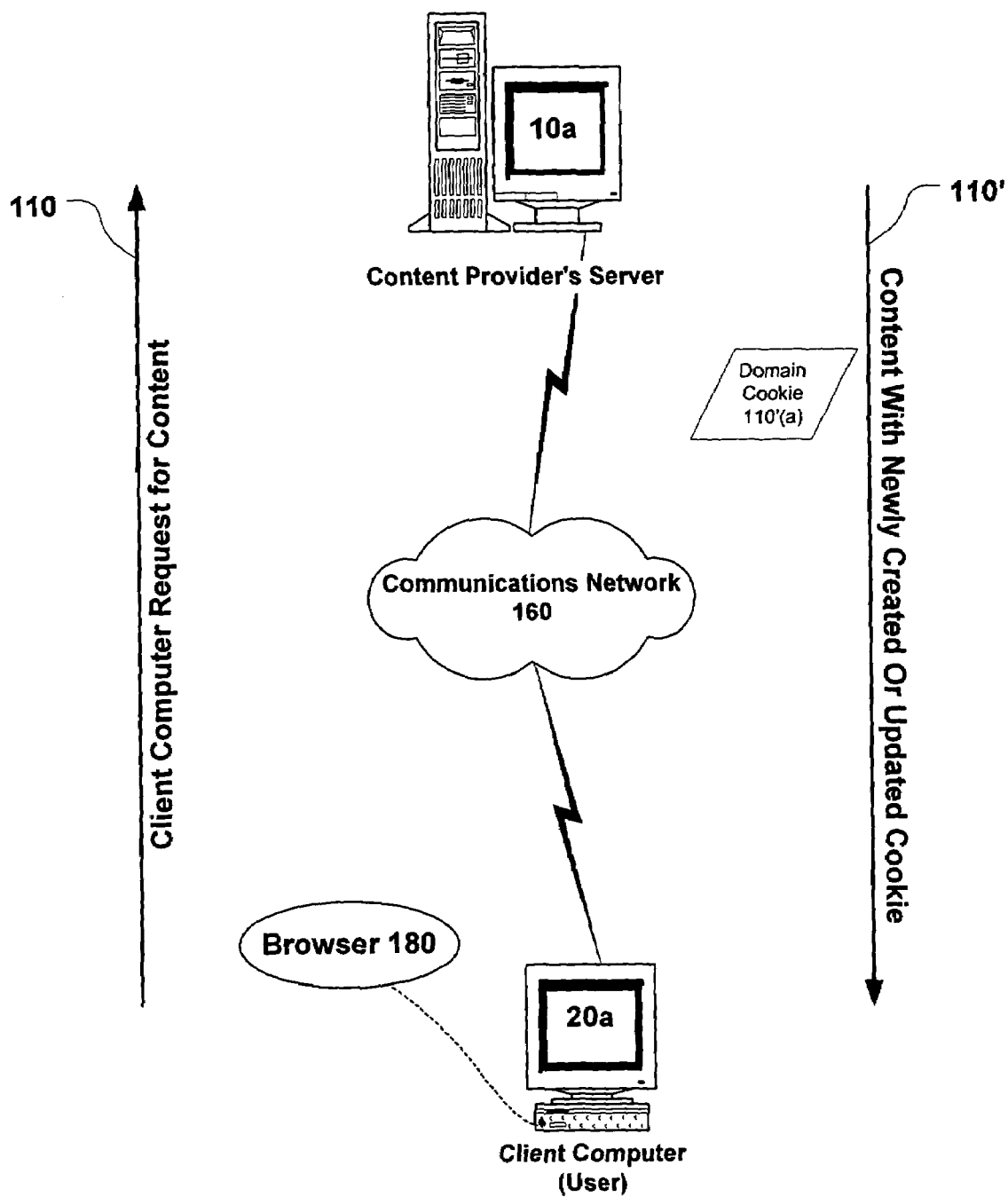
FIG. 3 is a block diagram of an HTML document with a newly created or updated cookie being transmitted from a server to a client computer in accordance with the present invention.

Computer network content providers seek to learn more about usage behaviors of users who visit their computer networks. As FIG. 3 shows, content providers may have access to such information through the cooperation between client computer 20a (representing a user of a U computer network) and a server computer 10a (representing a desired content provider). This cooperation is realized via the transmission of information over communication network 160. Client computer 20a may retrieve content from a content provider's server 10a by sending a request for content 110 over communications network 160. In turn, content provider's server computer 10a receives request 110, processes request 110 and passes back content 110' to client computer 20a. Included in the content 110' is a newly created or updated domain cookie (not shown). For example, when a user requests content from a given content provider (e.g. a request for a Web page from a Web site), for the first time, a cookie associated with that content, consisting of electronic data in the form of a file header is transmitted to the client computer 20a from the content provider's server computer 10a. In the alternative, when a user requests content from a previously visited content provider (e.g. a request for a content form a previously visited Web site), content provider's server computer 10a transmits electronic data to update the domain cookie previously created and stored on client computer 20a. In either scenario, the computing application facilitating the communication between the user and the content provider, that is, browser 180 of the client computer 20a, maintains the newly created or updated domain cookie and will transmit it on every HTTP request to servers that are inside the cookie's domain.

Figure 4:
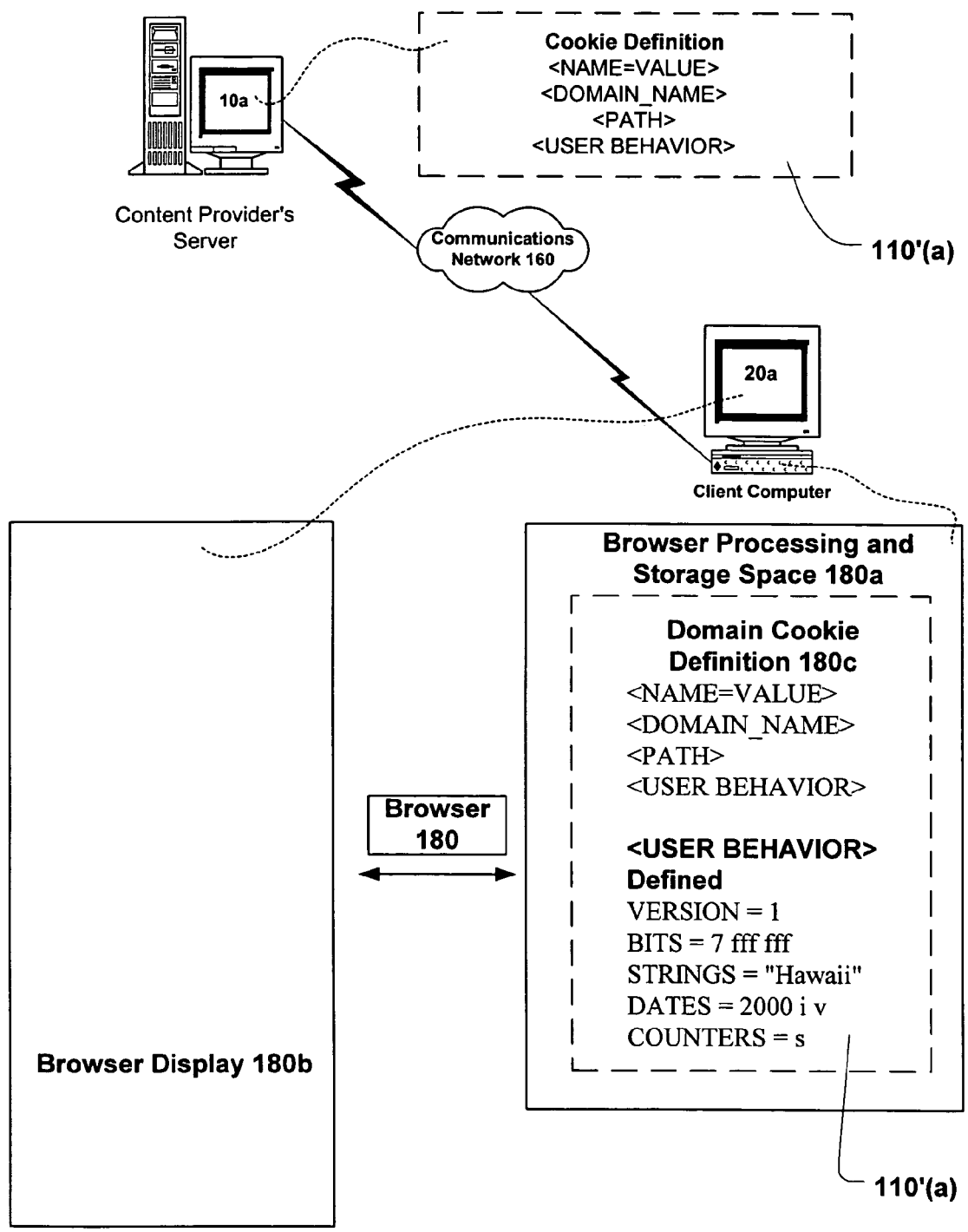
FIG. 4 is a block diagram of a server created or updated cookie being communicated to and from a browser in accordance with the present invention.

FIG. 4 shows the interaction that occurs between client computer 20a (user) and content provider's server 10a when employing domain cookie 110'(a). Domain cookie 110'(a) may be used to provide tracking information of client computer 20a (user) to content provider's server 10a. As shown, client computer 20a may run computing application browser 180 that may be used to facilitate communication between client computer 20a and content provider's server 10a. Browser 180 comprises browser processing and storage space 180a and browser display 180b. In operation, browser display 180b cooperates with browser processing and storage space 180a to display information to an operator (not shown) of client computer 20a.

Further, during operation, content provider's server 10a receives requests for content. When processing a request for content from client computer 20a, content provider's sever creates or updates domain cookie 110'(a) having cookie definition 180c in accordance with client computer's 20a most recent content request. Subsequently, content provider's server 10a passes domain cookie 110'(a) back to client computer 20a, where it is stored for future use in browser processing and storage space 180a of browser 180.

As mentioned briefly, a cookie may be included (i.e. in the situation where a client computer visited a given content provider's server previously) in a request for content from a particular content provider's server, such as server 10a. In the event that client computer 20a revisits content provider's server 10a, content provider server 10a is now able to determine if client computer 20a has visited content provider's server 10a from the information, or lack of information, that may be present in the transferred cookie.

Figure 4A:
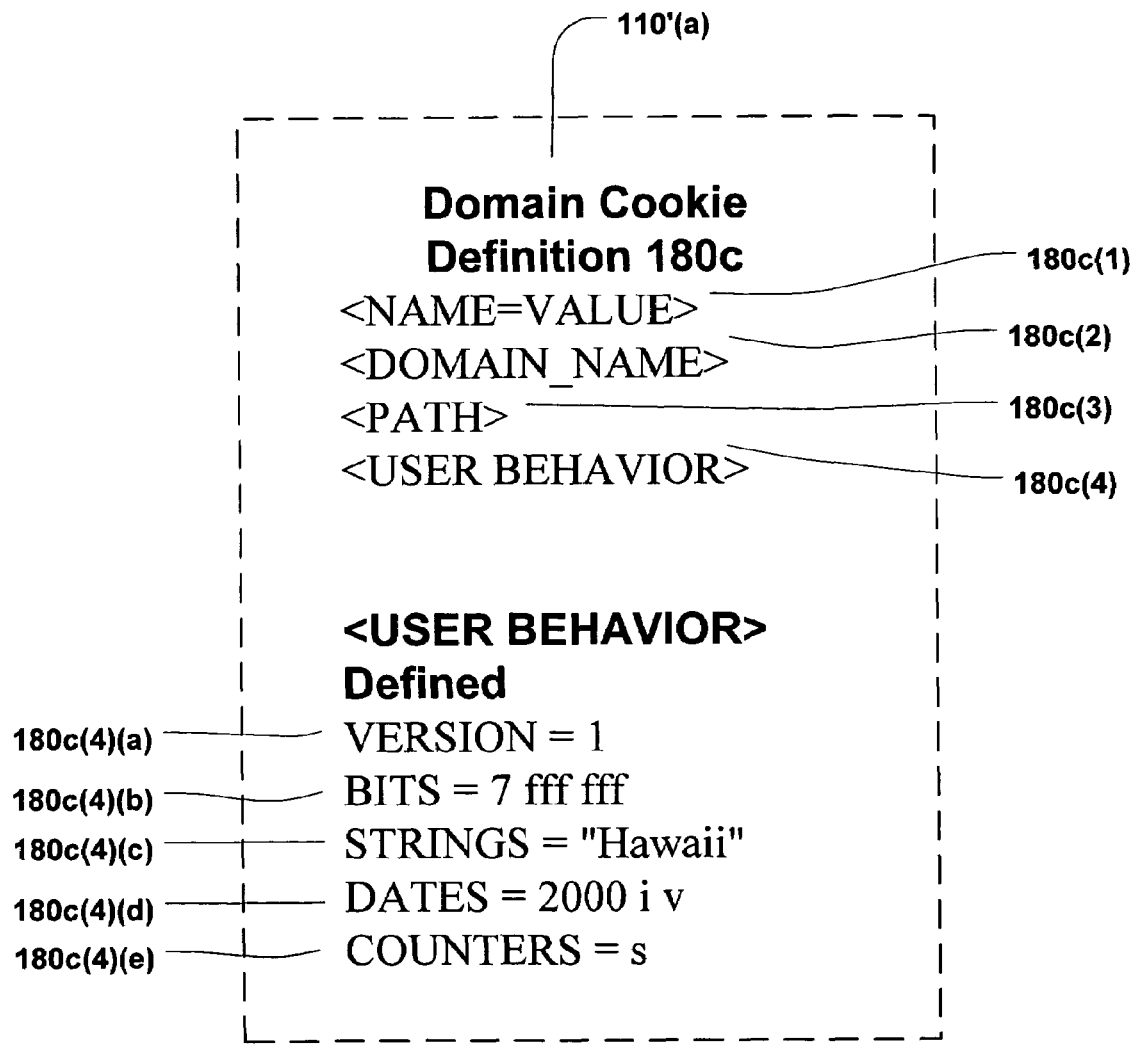
FIG. 4a is a block diagram of the server created or updated cookie in accordance with the present invention.

FIG. 4a with reference to FIG. 4 describes in more detail the use of cookie definition 180c of domain cookie 110'(a). As shown, domain cookie 110'(a) has a cookie definition 180c which is comprised of the variables NAME/VALUE pair 180c(1), DOMAIN_NAME 180c(2), and a PATH 180c(3). The VALUE part of cookie's NAME/VALUE pair 180c(1) is the USER BEHAVIOR 180c(4), which is further comprised of variable segments VERSION 180c(4), BITS 180c(5), STRINGS 180c(6), DATES 180c(7), and COUNTERS 180c(8). Each of the variables 180c(1)–180c(3) contain information which is used to identify domain cookie 110'(a). The variable NAME 180c(1) is used to provide an overall name for domain cookie 110'(a). DOMAIN_NAME 180c(2) stores information pertinent to the domain to which this domain cookie is to be associated. For example, a value for DOMAIN_NAME 180c(2) may be MSN.COM if domain cookie 110'(a) is associated with the Microsoft Network domain. The value for variable PATH 180c(3) determines which content can access domain cookie 110'(a) within content provider's server 10a domain. In order to maximize the effect of domain cookie 110'(a) in a given domain, domain cookie 110'(a) can be shared by the various directories and paths found in content provider's server 10a. As such, domain cookie 110'(a) variable PATH 180c(3) may be set to a value to indicate access to the root path of the content provider's server 10a directory structure. For example, a content provider's server 10a may have the PATH 180c(3) variable set as <PATH=/> to indicate root access for a cooperating domain cookie 110'(a). By having root access, domain cookie 110'(a) may be read from and may be written to by any content within a content provider's server(s). Although root access is preferred, the PATH 180c(3) variable may be used to limit access to domain cookie 110'(a) tracking information for given content.

The layout of the cookie is preferred to be flexible so that new data types can easily be added in the future. Accordingly, domain cookie 110'(*a*) variable USER BEHAVIOR 180*c*(4) may also contain a variable segment VERSION 180*c*(4)(*a*). This variable segment may provide information to accommodate any possible change in the meaning of certain variable segment such as BITS 180*c*(4)(*b*), STRINGS 180*c*(4)(*c*), DATES 180*c*(4)(*d*), or COUNTERS 180*c*(4)(*e*). Further, since in practice the domain cookie may be sent with every request for content, it is desired that the size of the domain cookie 110'(*a*) be small to maximize transfer and processing efficiency. Accordingly, variable segments 180*c*(4)(*a*)–180*c*(4)(*e*) are encoded to maximize space within the domain cookie 110'(*a*). In order to maximize processing efficiency, preserve space, and maintain the cookie as small as possible, the above data types may be encoded as follows: BITS 180*c*(5) are packed into blocks of 31 bits which are represented by one hexadecimal number; STRINGS 180*c*(6) are placed into the cookie unchanged, the only restriction is that they do not contain special characters that break the cookie format, otherwise the string would need to be encoded first; DATES are of the format YYM-MDD (4 digit year, month, and day), where the month and day are encoded as a 32-base integer (e.g. 1999bv stands for Dec. 31, 1999) and the month is zero based; and COUNTERS 180*c*(8) are encoded as hexadecimal numbers.

Figure 6:
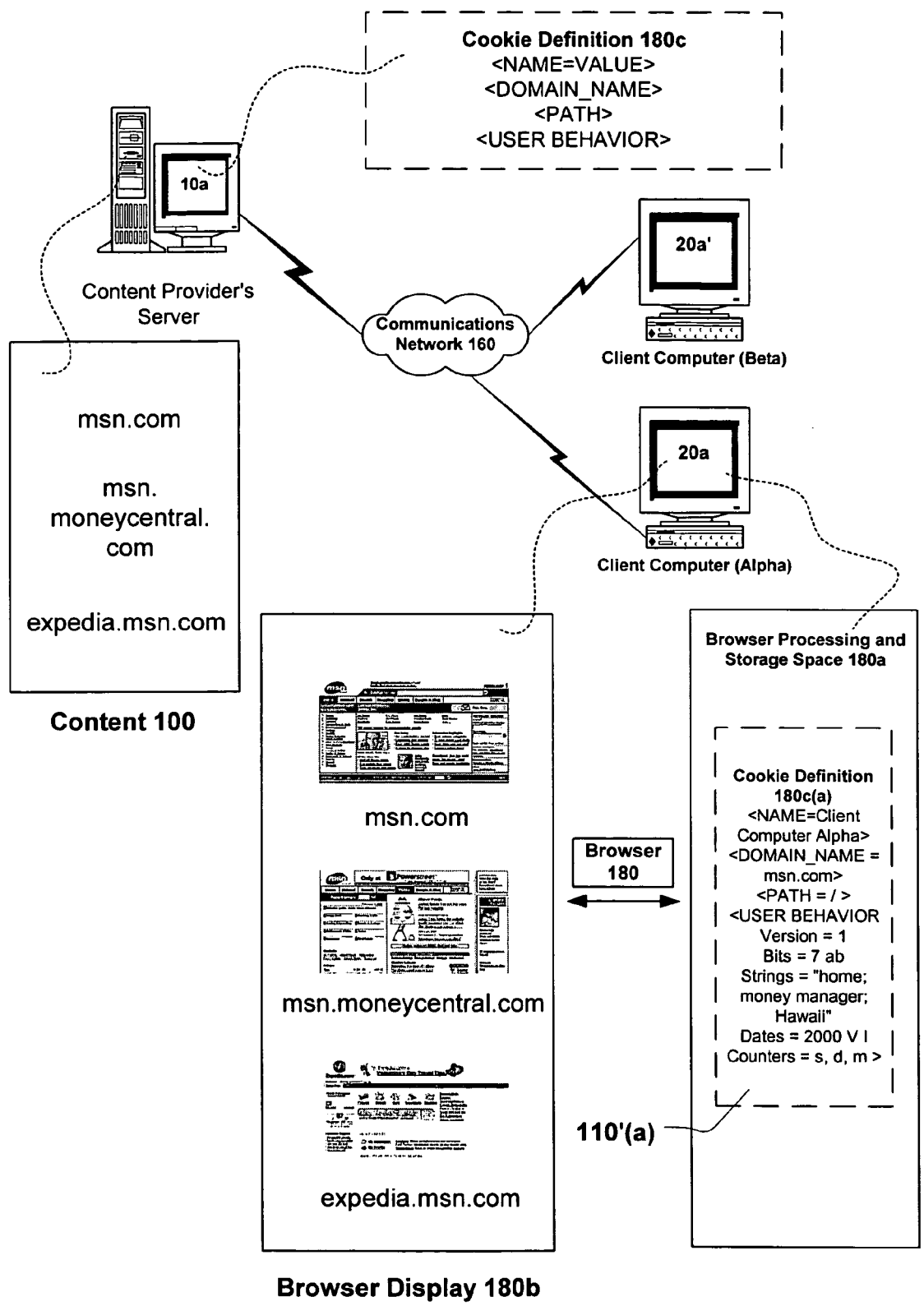
FIG. 6 is a block diagram of the interaction between a server computer and a client computer with the use of a domain cookie.
Figure 7:
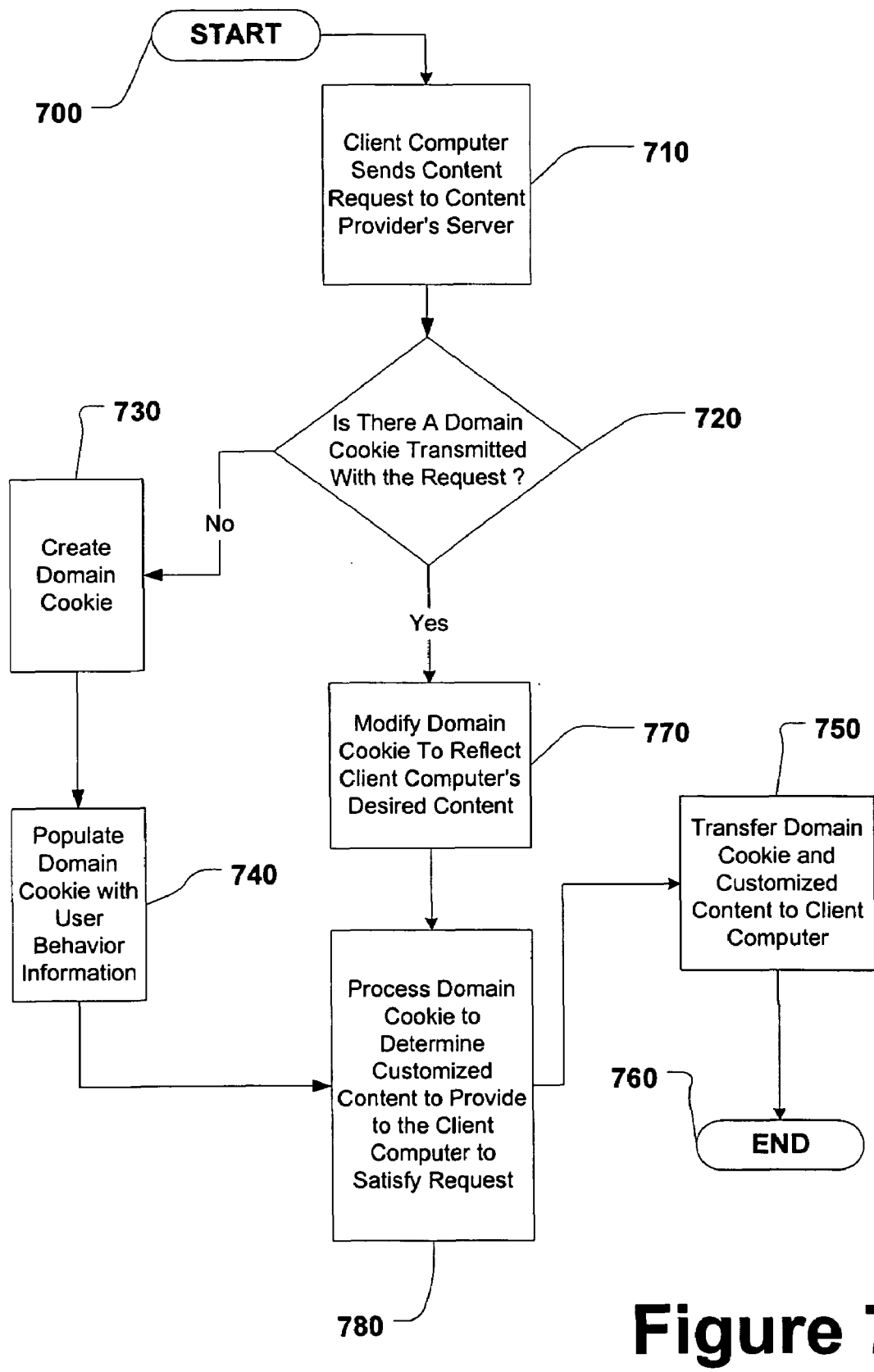
FIG. 7 is a flow diagram illustrating processing undertaken to populate and process a newly created or updated domain cookie in accordance with the present invention.

In operation, content provider's server 10*a* processes a request for content from client computer 20*a*. Content provider's server 10*a* can determine whether client computer 20*a*, requesting the content, has previously visited content provider's server 10*a* based on the existence of domain cookie 110'(*a*) in the transmitted request. That is, if client computer 20*a* has visited content provider's server 10*a* previously, a domain cookie specific to content provider's server 10*a* will be included with a request for content. Alternatively, when client computer 20*a* visits content provider's server 10*a* for the first time, a request, without domain cookie 110'(*a*), is sent to content provider's server 10*a*. In the event it is a repeat visit, content provider's server 10*a* updates domain cookie 110'(*a*) by populating the USER BEHAVIOR 180*c*(4)(*a*) 180(*e*) variables of domain cookie 110'(*a*). If the alternative is true, that is, it is a first time visit to content provider's server 10*a*, content provider's server creates domain cookie 110'(*a*) and populates the USER BEHAVIOR 180*c*(4)(*a*)–180*c*(4)(*e*) variables. Content provider's server 10*a* populates the USER BEHAVIOR 180*c*(4) variable segments 180*c*(4)–180*c*(8) based on the content that is visited. When populating variable segments 180*c*(4)–180*c*(8), content provider's server 10*a* utilizes the above-mentioned encoding. FIGS. 6–7, described with more detail below, illustrate this concept further.

Figure 5:
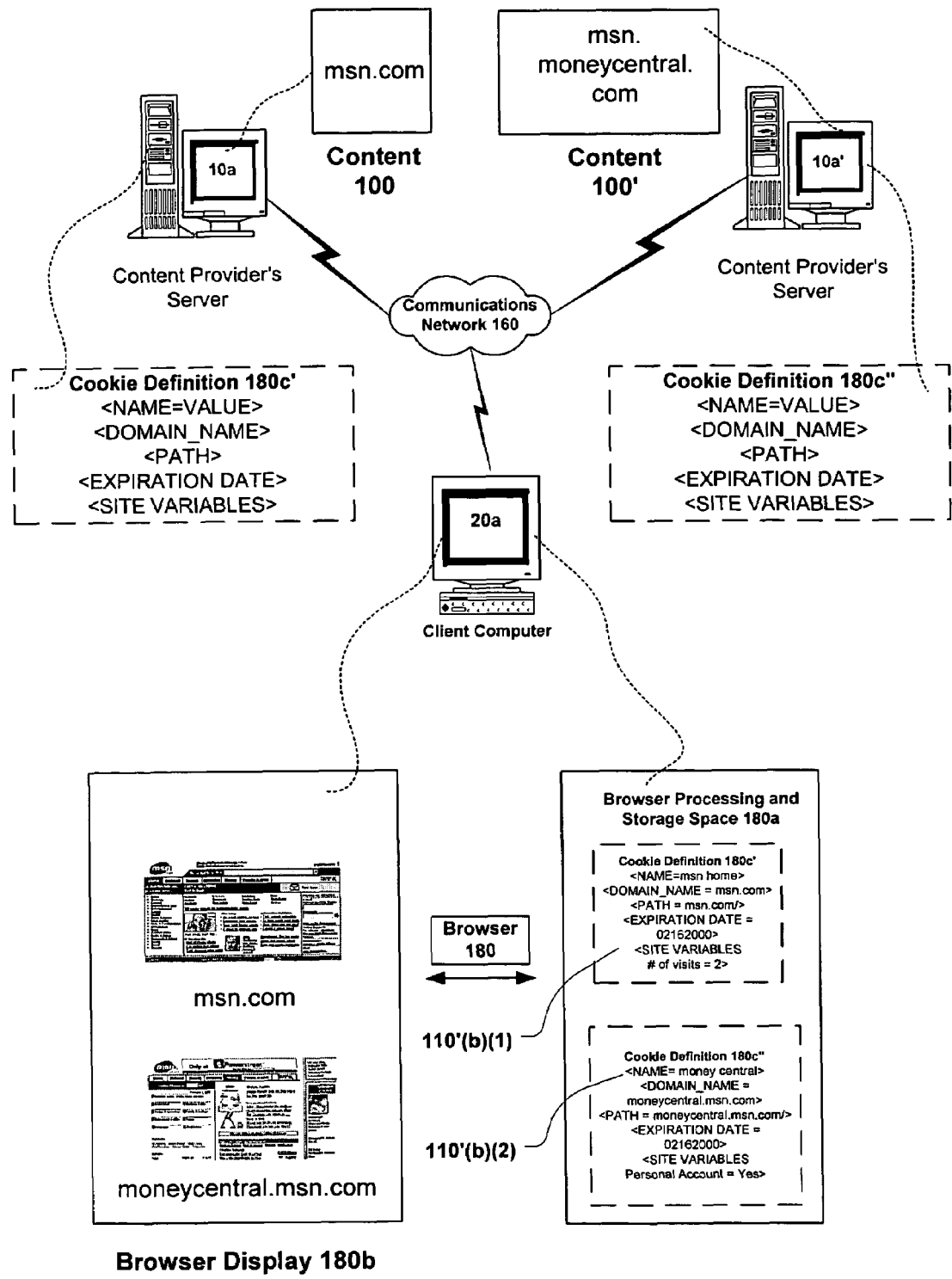
FIG. 5 is a block diagram of the interaction between a server computer and a client computer with the use of a regular cookie.

FIG. 5 is a block diagram of the interaction between a client computer 20*a* and content provider's server 10*a* using a domain specific cookie that is not shared among domains. As FIG. 5 shows, content provider's server 10*a* maintains cookie definition 180*c*' for cookie 110'(*b*)(1) and cookie definition 180*c*'' for 110'*b*(2). In operation, client computers 20*a* sends requests for content 100 and 100' from content provider's servers 10*a* and 10*a*', respectively, over communications network 160. For example, as illustrated in FIG. 5, client computer may send requests for content from MSN.COM and MONEYCENTRAL.MSN.COM, respectively. The content provider's server computer 10*a* processes client computer's 20*a* request for the MSN.COM request and content provider's server computer 10*a*' processes client computer's 20*a* request for MONEYCENTRAL.MSN.COM content and transmit the desired content back to client computer 20*a*. If client computer 20*a* has not been to content provider's server 10*a* or 10*a*' before, content provider's server 10*a* and 10*a*' create cookies 110'(*b*)(1) and 110'(*b*)(2), respectively, and populates cookies 110'(*b*)(1) and 110'*b*(2) to store general information about client computer's requests. Created cookies 110'(*b*)(1) and 110'(*b*)(2) are transmitted with the desired content to client computer 20*a*. Client computer 20*a*, in turn, passes cookies 110'(*b*)(1) and 110'*b*(2) to the browser processing and storage space 180*a* of computing application browser 180. The created cookie is now ready for use with future requests for content by client computer 20*a*.

For example, a client may request MSN.COM content from content provider's server 10*a*. Correspondingly, cookie 110'(*b*)(1) is either created or updated and passed back to client computer 20*a* with the desired MSN.COM content. Subsequently, client computer sends a request for MONEY-CENTRAL.MSN.COM content from a different content provider, i.e. content provider's server 10*a*'. Correspondingly, content provider's server 10*a*' either creates or updates second cookie 101'(*b*)(2). Cookie 101'(*b*)(2) is subsequently transmitted with the desired content back to client computer 20*a*. Both cookie 101'(*b*)(1) and 101'(*b*)(2) are stored in browser processing and storage space 180*a*. In both examples, the desired content 100 is displayed to an operator (not shown) of client computer 20*a* through browser display 180*b* area of computing application browser 180.

Further, FIG. 5 shows cookie definition 180*c*'having several variables that may used for data storage. Cookie definitions 180*c*' and 180*c*'' are similar to domain cookie definition 180*c* of FIG. 4 and FIG. 4*a* in that they are capable of storing data points about the content request and the targeted content itself. These storage variables may be used by content provider's server 10*a* to store simple, generic, values about the client computer's request. For example, when client computer 20*a* requests content from MSN.COM content provider's server 10*a*, login information about client computer 20*a* may be stored in the SITE VARIABLES storage area of cookie 110'(*b*)(1). Similarly, in the instance that client computer 20*a* requests MONEYCENTRAL.M-SN.COM content, personal account information about client computer 20*a* may be stored in the SITE VARIABLES storage area of cookie 110'(*b*)(2). Of import is the creation or update of a unique cookie for client computer 20*a* by each of the content provider's server computers 10*a* and 10*a*' in response to a request for content by client computer 20*a*.

As shown in FIG. 5, the variables of cookies 110'(*b*)(1) and 110'(*b*)(2) are populated with differing data to indicate that they are unique to the content provider's server computer 10*a* or 10*a*' respectively. Specifically, the PATH variables are set differently. Cookie 110'(*b*)(1) has its PATH variable set to MSN.COM and cookie 110'(*b*)(2) has a PATH variable set to MSN.MONEYCENTRAL.COM. Generally, a cookie may only create or update information within a cookie to which is has access. Access may be determined by looking to the PATH and DOMAIN variables of the cookie to see if the content provider's server is part of the listed path or domain of the cookie. Looking to FIG. 5, it may be said that content usage information of client computer 20*a* cannot be shared between content provider's server computers 10*a* and 10*a*' since cookies 110'(*b*)(1) and 110'(*b*)(2) maintain disparate PATH and DOMAIN designations.

FIG. 6 shows a block diagram of the interaction between client computer 20*a* and content provider's server 10*a* when utilizing domain cookie 110'(*a*). Similar to the operation described in FIG. 5, client computer 20*a* sends requests for content 100 to content provider's server 10*a* over communications network 160. Content provider's server processes requests received and, either, creates or updates domain cookie 110'(a) in accordance with client computer's requests. However, unlike the operation described by FIG. 5 with normal non-domain cookies 110'(b)(1) and 110'(b)(1), content provider's server 10a content 100 is configured to create or update information in a single domain cookie 110'(a) to reflect client computer's usage behavior.

For example, client computer 20a may send a request for content to content provider's server 10a for the first time (e.g. a first request for MSN.COM content). This request prompts content provider's server 10a to create domain cookie 110'(a) having cookie definition 180c. As indicated above, cookie definition 180c comprises variables and variable segments that, when decoded, provide substantive information about a user's usage behavior. As a result of client computer 20a request for MSN.COM content, content provider's server 10a populates the variables of the newly creates domain cookie 110'(a) with information to indicate that it is a domain level cookieThis is accomplished by setting the various variables of domain cookie 110'(a) to the following values: DOMAIN_NAME=*.MSN.COM; and PATH=/. In addition, content determined encoded user tracking information is populated in the variable segments Version, Bits, Strings, Dates, and Counters of the VALUE part of the NAME/VALUE pair 180a(1). For example, since it is client computer 20a first visit to the MSN.COM, the variable segment Counter may be encoded (in the encoding scheme described above) to indicate it is client computer 20a first visit. Accordingly, the other variable segments may be populated with other pre-determined user tracking information that the content provider desires. Content provider's server 10a then sends the newly created and populated domain cookie 110'(a), along with the initially desired content to client computer 20a. Subsequently, client computer 20a processes and stores domain cookie 110'(a) in browser processing and storage space 180a of computing application browser 180 to transmit it to content provider's server 10a on subsequent requests.

Generally, as part of computing application browser 180 functionality, cookies associated with desired content are included with a request for such content. That is, if a client computer navigates to content A and a cookie is associated with content A, the cookie is included in any subsequent request for content A. In the context of the present invention, domain cookie 110'(a) may provide, by its variable definitions and settings, access to domain cookie 110'(a) by subcategories of general content. That is, different properties within a given domain may have access to update a domain cookie created for that domain. For example, if the DOMAIN_NAME variable is set to "*.MSN.COM" and the PATH variable of domain cookie 110'(a) is set to root (i.e. "/"), any content provided by MONEYCENTRAL.MSN.COM may read from and write to a domain cookie created for the MSN.COM domain)

Thus, if client computer 20a then decides it desires MONEYCENTRAL.MSN.COM content after having received MSN.COM content, client computer 20a sends a request for the MONEYCENTRAL.MSN.COM content to content provider's server 10a. Before sending the request for MONEYCENTRAL.MSN.COM content, client computer 10a processes the request to determine if any cookies have been associated with the desired content. If so, the cookie is included in the request for the desired content. In the example of the MONEYCENTRAL.MSN.COM request, domain cookie 110'(a) is included in the request for the MONEYCENTRAL.MSN.COM content since the desired MONEYCENTRAL.MSN.COM is associated with the MSN.COM cookie. That is, the desired MONEYCEN-TRAL.MSN.COM content falls directly within the MSN-.COM domain cookie's DOMAING_NAME and PATH setting (i.e. giving root access to all MSN.COM domain properties, including MONEYCENTRAL.MSN.COM) of domain cookie 110'(a). As a result, MONEYCENTRAL.M-SN.COM content may read and write to the transmitted domain cookie 110'(a). Content provider's server 10a processes the request for MONEYCENTRAL.MSN.COM content and updates domain cookie 110'(a) with user behavior information according to predefined MONEYCEN-TRAL.MSN.COM content requirements. Now, domain cookie 110'(a) has usage behavior information for both the MSN.COM content request and the MONEYCENTRAL.M-SN.COM content request originated by client computer 20a. Content provider's server 10a may process the usage behavior information to determine preferences for additional content customized to that particular client computer. Content provider's server 10a then transmits the desired MONEY-CENTRAL.MSN.COM content and any created customized content, along with updated domain cookie 110'(a), back to client computer 20a over communication network 160. Client computer 20a receives updated domain cookie 110' (a), processes, and stores domain cookie 110'(a), for future use, in browser processing storage space 180a of computing application browser 180. In turn, the desired MONEYCEN-TRAL.MSN.COM content and customized content is passed to the browser display 180b portion of computing application browser 180 for display.

For example, content provider's server 10 may process domain cookie 110'(a) and determine that client computer 20a is not a first time visitor. As such, client computer 20a may be entitled, for example, to a special offer to non-first time visitors of the MSN.COM content. In addition to the desired content, content provider's server may provide additional customized content to client computer 20a describing the special offer.

Subsequently, if client computer 20a submits another request for content from a property within the MSN.COM domain, i.e. EXPEDIA.MSN.COM client computer 20a and content provider's server 10a perform identical operations as with the MONEYCENTRAL.MSN.COM content request. Accordingly, domain cookie 110'(a) will be updated with EXPEDIA.MSN.COM content defined user behavior information, in accordance with client computer 20a EXPE-DIA.MSN.COM content request. As shown in FIG. 6, the variable segments Version, Bits, Strings, Dates, and Counters of variable USGE BEHAVIOR for domain cookie 110'(a) are populated to reflects usage behavior by client computer 20a in the MSN.COM domain and MSN.COM properties, MONEYCENTRAL.MSN.COM and MSN.EX-PEIDA.COM, respectively. These concepts are further described in the illustrative embodiment provided below.

Additionally, FIG. 6 shows a second client computer 20a' (Client Computer Beta). The present invention contemplates computer systems having a plurality of client computers and server computers. However, a domain cookie, such as domain cookie 110'(a) is unique as between one client computer, such as client computer 20a, and a server computer, such as server computer 10a. Thus, a domain cookie may not be shared among client computers of a given computer network. That is, a domain cookie, such as domain cookie 110'(a) created specifically for client computer 20a, may not be shared with client computer 20a'.

Illustrative Embodiment—Using Domain Cookie to Track Users

In an illustrative implementation, the invention consists of a set of API (Application Program Interface) calls that enables Internet content providers to read and write from the MSN.COM domain cookie. Example implementations for accessing the cookie are:

- A Java Script (JScript) implementation to be used by MSN.COM properties that run Active Server Pages (ASP) in combination with Java Script.
- A Visual Basic Script (VB Script) implementation to be used by MSN.COM properties that run Active Server Pages (ASP) in combination with VB Script.
- Using an image within a Internet content segment to allow sharing of the domain cookie with partner Internet content providers by allowing write-only functions to a created MSN.COM domain cookie.

The contemplated cookie is a permanent domain cookie (not a session cookie) for the Internet content domain (e.g. Domain=".msn.com", Path="/", and Expires="<some future date>"). The cookie may support four data types:

- bits (yes/no)
- counters
- dates
- strings

The layout of the cookie is preferred to be flexible so that new data types can easily be added in the future. In addition it may also contain version information to accommodate any possible change in the meaning of certain bits, counters, dates, or strings. Further, in order to maximize processing efficiency, optimize transfer speed, preserve space, and maintain the cookie as small as possible, the above data types may be encoded as follows:

- bits are packed into blocks of 31 bits which are represented by one hexadecimal number
- counters are encoded as hexadecimal numbers
- dates are of the format yyyymd (4 digit year, month, and day), where the month and day are encoded as a 32-base integer. (e.g. 1999bv stands for Dec. 31, 1999). The month is zero based
- strings are placed into the cookie unchanged. However, if a string contains special characters that may break the cookie structure, the string has to be encoded first.

The following, in conjunction with FIG. 4a, illustrate the layout of the MSN.COM domain cookie containing user information:

User=
   Bits=<version>, 7fffffff, . . . &
   Counters=<version>, 5, f2, 1a, . . . &
   Dates=<version>, 199965, 1999bv, 2000ap . . . &
   Strings=<version>, TypeA, String2, String3 . . .

In addition, a set of API calls are required to create, read, and write the bits, counters, dates, and strings of the domain cookie. What follows are illustrative examples of such function calls:

Creation and Initialization Functions

Customer_CreateBit(bitblock, offset);
   This function returns the handle to the bit.
Customer_CreateCounter(counter);
   This function returns the handle to the counter.
Customer_CreateDate(date);
   This function returns the handle to the date.
Customer_CreateString(string);
   This function returns the handle to the string.

Bit Functions

Customer_ReadBit(bithandle);
   This function returns 1 if the bit is set, 0 otherwise
Customer_SetBit(bithandle);
   This function sets the bit.
Customer_ResetBit(bithandle);
   This function resets the bit.

Counter Functions

Customer_ReadCounter (counterhandle);
   This function returns the current value of the counter.
Customer_AddToCounter(counterhandle, delta);
   This function adds the delta to the current counter value. The delta can be negative to decrement the counter value.
Customer_SetCounter(counterhandle, value);
   This function sets the counter to the given value.

Date Functions

Customer_ReadDate(datehandle);
   This function returns the date.
Customer_SetDate(datehandle, date);
   This functions sets the date.

String Functions

Customer_ReadString (stringhandle);
   This function returns the string.
Customer_SetString(stringhandle, string);
   This function sets the string.

Any of the above functions may be called from within the script of the Active Server Page (ASP) that is run on a Internet content server inside the an exemplary domain, such as, MSN.COM domain. However, MSN.COM (i.e. the Microsoft Portal) will maintain the master list of all bits, counters, dates, and strings that are tracked for MSN users who are listed on the MSN domain cookie. In other words, the meaning of all bits, counters, dates, and strings inside the MSN.COM domain cookie are assigned by MSN.COM, and each bit, counter, date, and string is given a symbolic name that other MSN.COM properties would use to access the domain cookie.

By way of example, the proceeding pseudo code illustrates the usage of the above API calls by MSN.COM properties to utilize the domain cookie. The example contemplates a user who has navigated to the EXPEDIA.MSN.COM property within the MSN.COM domain. For the purposes of this example it is assumed that EXPEDIA.MSN.COM has asked to track two bits (yes/no values) and one date. Accordingly, WWW.MSN.COM will add the following three lines to the API's code to facilitate this request. This leaves EXPEDIA.MSN.COM™ to know what the names of their bits and date are:

Customer_Bit_Expedia1=
CreateBit(<somenumber>,<somenumber>);
Customer_Bit_Expedia2=
CreateBit(<somenumber>,<somenumber>);
Customer_Date_Expedia=CreateDate(<somenumber>);

Correspondingly, in the default.asp of EXPEDIA.MSN.COM domain (or whichever other file the user information is to be used), the file with the User Tracking API will have to be included:

<!--#include file="inc/user.inc"-->

Once included, EXPEDIA.MSN.COM will have access to their bits and date, e.g.

```
// check if user has been here already
if (User_ReadBit(User_Bit_Expedia1))
{
    // find out when the user first visited
    var firstvisit = User_ReadDate(User_Date_Expedia);
    ...
} else
{
    // first visit to Expedia
    // set bit indicating customer has been here
    User_SetBit(User_Bit_Expedia1);
    // record the date the customer first visited (today)
    User_SetDate(User_Date_Expedia, new Date( ));
    ...
}
```

When the user visits another MSN.COM property, it is easy to determine whether the user has been to the EXPEDIA.MSN.COM property before, and when the first visit was.

FIG. 7 in conjunction with FIG. 6 describe the processing that is undertaken by client computer 20*a* and server computer 10*a* when utilizing domain cookie 110'(*a*). As shown, processing starts at block 700 and proceeds to block 710. At block 710, client computer 20*a* transmits a request for content to content provider's server 20*a*. In turn content provider's server 10*a* checks to see if there is a domain cookie transmitted with the content request at block 720. If, a domain cookie is not included in the content request, content provider's server 10*a* will create domain cookie at block 730. At block 740, domain cookie is populated with user behavior information in accordance with client computer's request for content. Content provider's server then processes the usage behavior information at block 780 to determine which customized content to transmit to client computer 20*a*. The domain cookie is then transferred to client computer 20*a*, along with the desired and customized content, at block 750. Processing then terminates at block 760.

However, if a domain cookie is included with client computer 20*a*'s request at block 720, content provider's server 10*a* modifies the transmitted domain cookie at block 770 with user behavior information in accordance with client computer's 20*a* content request. Processing then proceeds to block 780 where content provider's server processes the transmitted domain cookie to determine which customized content to provide to client computer 20*a*. Content provider's server 10*a* then proceeds to transfer the domain cookie, along with the desired and customized content, at block 750. Processing then terminates at block 760.

The present invention may also be employed as part of a system to track user behavior across a computer network comprising differing content providers (i.e. different domains on the Internet). FIG. 8 is a block diagram of the interaction that occurs between client computer 20*a* and content provider's servers 10*a* and 10*a'* when utilizing domain cookie 110'(*a*) to track user behavior among differing content providers. As shown in FIG. 8, client computer 20*a* may request content 100 from content provider alpha's server 10*a*, or alternatively request content 100*a* from content provider beta's server 10*a'* by sending a request over communication network 160. However, unlike the operations described by FIG. 6 and FIG. 7, content provider alpha's server 10*a* and content provider beta's server 10*a'* cannot both respond to client computer's 20*a* content requests by creating or updating a domain cookie 110'(*a*). Domain cookie 110'(*a*) is specifically created or updated for client computer 20*a* by one of the cooperating content provider's server computers 10*a* or 10*a''* (for example the MSN.COM domain). As before, domain cookie 110'(*a*) is created for the requesting client computer and may not be shared with other cooperating client computers, such as client computer beta 20*a'*. However, content provider alpha's server 10*a* and content provider beta's server 10*a''* may employ the present invention in a system, as described in FIG. 8*a*, to track client computer's 20*a*. In operation, content provider alpha's server 10*a* and content provider beta's server 10*a''* cooperate according to the described system of FIG. 8*a* to populate domain cookie 110'(*a*) with usage data, along with desired and customized content to client computer 20*a*. In accordance with the steps of FIG. 8*a*, if client computer 20*a* requests content from MSN.COM, EXPEDIA.MSN.COM, and FORD.COM, respectively, the USER BEHAVIOR variable of domain cookie 110'(*a*) may be populated with usage information related to such content requests. For example, as shown in FIG. 8, the String variable segment of the USER BEHAVIOR variable is populated with the strings "Hawaii", and "Mustang." Such strings may indicate that client computer 20*a* has requested information about Hawaii, and has viewed the latest car offering by Ford, the Mustang.

In an illustrative embodiment of the present invention, as shown below, user behavior information may be tracked across a computer network comprising differing providers through the use of a tracking cookie. Through a partnership among the differing content providers, a domain cookie can be shared allowing the sharing of read and write privileges to the domain cookie. Accordingly, FIG. 8*a* and FIG. 9 depict the processing that occurs by client computer 20*a* and content provider's servers 10*a* and 10*a'*, respectively, when utilizing the tracking cookie consistent with the illustrative embodiment. As shown in FIG. 8, client computer 20*a* may send a request for content to a partner domain 10*a'*(i.e. a cooperating content provider partnered with the content provider wishing to track user behavior, e.g. FORD.COM). In turn, partner domain 10*a* receives the content request and responds by sending content including a pointer that redirects client computer 20*a* to the domain tracking user behavior. Client computer is redirected to tracking domain 10*a'* (e.g. MSN.COM) where a domain cookie is either created or updated to reflect user behavior in accordance with the request for content from the partner domain (i.e. a domain cookie is populated with information to reflect that the client computer requesting FORD.COM content has requested FORD.COM content and other related usage information). Client computer 20*a* is then redirected to request the desired content from partner domain 10*a'*. In response, partner domain 10*a'* provides the desired content to client computer 20*a*.

By embedding a pointer to direct users requesting content from a partner domain to visit the tracking domain, a domain cookie associated with the tracking domain may be used to track user behavior within the partner domain. However, for a tracking domain (e.g. MSN.COM) to able to track users (client computers) navigating in other domains (e.g. FORD.COM) using domain cookies, the tracking domain must be able to write to a domain cookie. Generally, a tracking domain (e.g. MSN.COM) can write to domain cookies for users (client computers) visiting the tracking domain. Thus, in order to be able to write to the cookie of a user that is visiting a partner domain's content, a tracking domain must be able to attract a user visiting the partner domain to the tracking domain. This is accomplished by embedding a pointer within the partner domain (e.g. FORD.COM) to point to the tracking domain, since the tracking cookie belongs to the tracking domain and is only transmitted with HTTP requests to web servers inside the tracking domain. By doing so, the tracking domain (e.g. MSN.COM) is allowed to create and update a domain cookie (i.e. write information to the domain cookie) with information relevant to the user's usage behavior. However, such implementation requires a tacit agreement among the tracking and partner domains such that these pointers may be properly embedded within the respective content.

Illustrative Embodiment—Tracking Users Visiting Different Domains

Domain cookie 110'(a) may be used to track a user's behavior when using a partner's Internet content. The following example pseudo code illustrates how a partner of MSN outside the MSN.COM domain would contribute to the collection of user behavior data by writing to the MSN.COM domain cookie. In the example contemplated, the user may travel to the FORD.COM domain.

Within the partner's Internet content, an image is referenced with a user's request for content from a partner site. The referenced image is a pointer to an ASP page inside the MSN.COM domain:

<img src="http://tracking.msn.com/ford/visited.asp">

The browser will request the above URL and the ASP page will run on server (e.g. tracking.msn.com) within the MSN.COM Domain. The code of the ASP page could be as follows:

```
<!--#include file="inc/user.inc"-->
// check if user has been to FORD already
if (!User_ReadBit(User_Bit_Ford1))
{
    // first visit to Ford
    // set bit indicating user has been at FORD
    User_SetBit(User_Bit_Ford1);
    // record the date the user first visited (today)
    user_SetDate(user_Date_Ford, new Date( ));
}
// now redirect to the real image
Response.Redirect("http://ford.com/images/image.gif");
```

The user computer application (e.g. a web browser) will now redirect and download the real image. By then, the change to the MSN.COM domain cookie has been recorded.

In this example, the expedia/visited.asp page is designed to record the first visit toFORD and redirect the client to an agreed upon image. In the alternative, it is possible to use a generic ASP page that gets its information on what to write to the domain cookie and where to redirect the user to from query parameters of the URL. The pseudo-code for this example may look like:

<img src="http://tracking.msn.com/default.asp ?event=fordvisit&redirect=http://ford.com/images/image.gif">

By doing so, the generic ASP page would now have to read the query parameters and react by sending the user accordingly.

FIG. 9 with reference to FIG. 8, illustrates the processing performed by a tracking domain, partner domain, and a client computer when utilizing domain cookies to track users across computer networks comprising differing content providers (i.e. domains). Processing starts at block 900 and proceeds to block 905 where a check is performed to see if a request initiated by client computer 20a is directed to a partner domain 10a'(i.e. the non-tracking content provider). If the request is not directed to a partner domain 10a', processing terminates at block 910. However, if the alternative is true, processing proceeds to block 915 where client computer 20a sends a request for content to partner domain 10a'. Partner domain 10a' responds to client computer's 20a request at block 920 providing content that includes a pointer to direct client computer 20a to the tracking domain 10a (i.e. the tracking content provider). Using the pointer, e.g. and image embedded in the content with its source in the tracking domain, client computer 20a issues a HTTP request to tracking domain 10a to request the embedded content at block 925. As part of this HTTP request to the tracking domain for the embedded content, client computer sends the tracking cookie at block 925 to tracking domain 10a. Tracking domain 10a accepts client computer's 20a request at block 930. Tracking domain 10a then determines if a domain cookie needs to be created for client computer 20a at block 935. If a domain cookie does not need to be created (i.e. the domain cookie was included in the request for content from the tracking domain) at block 935, processing proceeds to block 940. At block 940, tracking domain 10a modifies the transmitted domain cookie, using the pointer information (e.g. parameters on the URL of the request to the tracking domain, or the URL requested has a predefined meaning and action with regards to updated the tracking cookie), to indicate user behavior in accordance with client computer's 20a request for content from partner domain 10a. Tracking domain 10a then proceeds to transfer the domain cookie to client computer 20a at block 950. Accordingly, client computer 20a stores domain cookie at block 955. Client computer 20a is then redirected to partner domain 10a' to retrieve the initially desired content at block 960. As indicated by block 965, client computer 20a sends a second request for the initially desired content. However as part of this request, the modified domain cookie is not transmitted to partner domain 10a. Partner domain 10a responds by transferring the initially desired content back to client computer 10a. Processing then terminates at block 910.

In sum, the present invention provides a system and process for tracking user behavior across computer networks, preferably using a domain level cookie having utilized by client-side and server side-computing applications. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. In a first computer system hosting a plurality of content components, a method for selectively providing content to a user, comprising the acts of:
   receiving a request for selected content components from a client computer;
   receiving an information set from said client computer uniquely associated with said client computer, said first computer system having a first domain name and at least one other computer system having a second domain name that is different from said first domain name and wherein at least a portion of the first and second domain names are identical;
   determining other ones of said selected content components relevant to said user, said other ones of said selected content components being selected based on said usage information found in a usage behavior portion of said information set wherein said usage information is based on actions performed on said at least one other computer;
   transmitting said information set indicative of said other ones of said selected content components to said user; and
   transmitting said information set to said user.

2. The method recited in claim 1, wherein said other ones of said selected content components comprises at least one of the following group: targeted advertisements, special offers, special display formats; unique services; and user control to customize desired content.

3. The method recited in claim 1, wherein said information set becomes data rich and tracking significant with increasing content usage by said client computer.

4. The method recited in claim 3, wherein said usage information is clustered to determine an affinity between the client computer and content sought, said affinity employed to transmit information of said other ones.

5. The method recited in claim 1, wherein said information set is received substantially simultaneously with said request for said content.

6. The method recited in claim 1, wherein said information set is created for said client computer requesting said content for a first time.

7. A computer-readable medium having computer executable instructions for performing the acts recited in claim 1.

8. The method recited in claim 1, wherein said information set contains information that can be used to create a psychographic profile.

9. The method recited in claim 8, wherein said psychographic profile is used by providers of said content to enhance said content.

10. In a computer system having a domain having content on at least two servers, a method for tracking the usage behavior of said client computer comprising the acts of:
    receiving a cookie from said client, said cookie being accessible by either one of said at least two servers having first and second domain names, respectively, wherein the first and second domain names are not identical but have at least a portion of their domain names in common;
    updating a usage behavior tagged portion of said cookie with information relevant to the usage within said domain; and
    transmitting said cookie to said client computer wherein at least the server having the second domain name can provide content to said user as a function of usage information from the server having the first domain name.

11. The method recited in claim 10, wherein said information populated in said cookie is changed in response to a request for said content of said domain by said client computer.

12. The method recited in claim 10, wherein said cookie is included in a request for said content.

13. The method recited in claim 12, where in said cookie is created for said client computer requesting said content of said domain for the first time, and updated for said client computer that has previously requested said content of said domain.

14. A computer-readable medium having computer executable instructions for performing the acts recited in claim 10.

15. A method for tracking usage of content at a domain level, comprising the acts of:
    requesting content of a first server at an address associated with a first domain name by a client computer;
    sending a cookie corresponding to the first domain name from said client to said first server;
    requesting content of a second server at an address associated with a second domain name that is different from the first domain name but that shares at least a portion of its domain name in common with the first domain name;
    sending the cookie corresponding to the first domain name from said client to said second server; and
    receiving content from said second server based on usage information of the client computer on the first server contained in a portion of said cookie having a usage behavior tag.

16. The method recited in claim 15, wherein said cookie is created by said first server for said client computer requesting said content for the first time, and updated for said client computer when it has previously requested said content.

17. A computer-readable medium having computer executable instructions for performing the acts recited in claim 15.

18. A system for tracking the usage behavior for a user of a client computer system, comprising:

at least two server computers hosting content, said at least two server computers sharing at least a portion of a domain name but wherein said domain names are not identical;

said at least one client computer cooperating with at least one of said server computers through a computing application; and a cookie cooperating with said computing application having a usage behavior tag such that either of said at least two server computers can read and write usage information associated with said client computer to said portion of said cookie indicated by said usage behavior tag and wherein said each of the at least two server computers can provide content to said client based on the usage information written by the other server computer.

19. The system recited in claim 18, wherein said configuration for said cookie comprises a data storage area having a predefined data format allowing for the storage of encoded data.

20. The system recited in claim 19, wherein said content encodes various data types for said usage information associated with said client computer in said data storage area.

21. The system recited in claim 20, wherein said data type encoded in said data storage area depends on said content encoding said usage information.

22. The system recited in claim 18, wherein said system comprises at least one of the following group: the Internet, an intranet, a local area network (LAN) and a wide area network (WAN).

23. The system recited in claim 18, wherein said cookie size does not exceed 4 Kilobytes.

24. In a computer system hosting a plurality of content components, a system for selectively providing content to a client computer, comprising:
   a means for receiving at a first server a request for selected content components from a client computer;
   a means for receiving a file associated with said client computer;
   a means for updating said file with usage information related to said request for selected content in a portion of said file designated for usage behavior tracking;
   a means for determining other ones of said selected content components relevant to said user, said other ones of said selected content components being selected based on said usage information found in said file where said usage information comprises usage information of content on another server located at an address specified by a domain name that is not identical to but having a portion in common with the domain name associated with the address of the first computer;
   a means for transmitting said information indicative of said other ones of said selected content components to said user; and
   a means for transmitting said file back to said user.

25. A system for tracking the usage behavior of a client computer comprising:
   a means for accessing a cookie comprising a usage behavior designated portion by a server at an address associated with a first domain name, said cookie being accessible by at least another server associated with a second domain name, wherein the first and second domain names are not identical but have a least a portion in common;
   a means for populating said cookie with said information relevant to the usage of said server associated with the first domain name; and
   a means for transmitting said cookie back to said client computer so that said at least another server can retrieve the usage information and present content to said client computer based thereon.

26. The usage behavior tracking system recited in claim 25, wherein said means for accessing a cookie by said server comprises a pointer to another domain.

27. In a computer system having at least two domain names sharing at least a portion of a domain name, a system for tracking a client computer's usage comprising:
   a means for requesting content of one of said at least two domains by said client computer;
   a means for receiving a cookie from a server in said one of said at least two domains, said domains not being identical but having a portion in common, by said client computer, said cookie maintained by said server specifically for said client, said cookie comprising a tag indicative of a portion of information about the usage of said content by said client computer;
   a means for storing said cookie by client computer; and providing said cookie to a server on the other one of said two domains wherein said server can provide content to said client computer based on said usage information.

* * * * *